Figure 1:
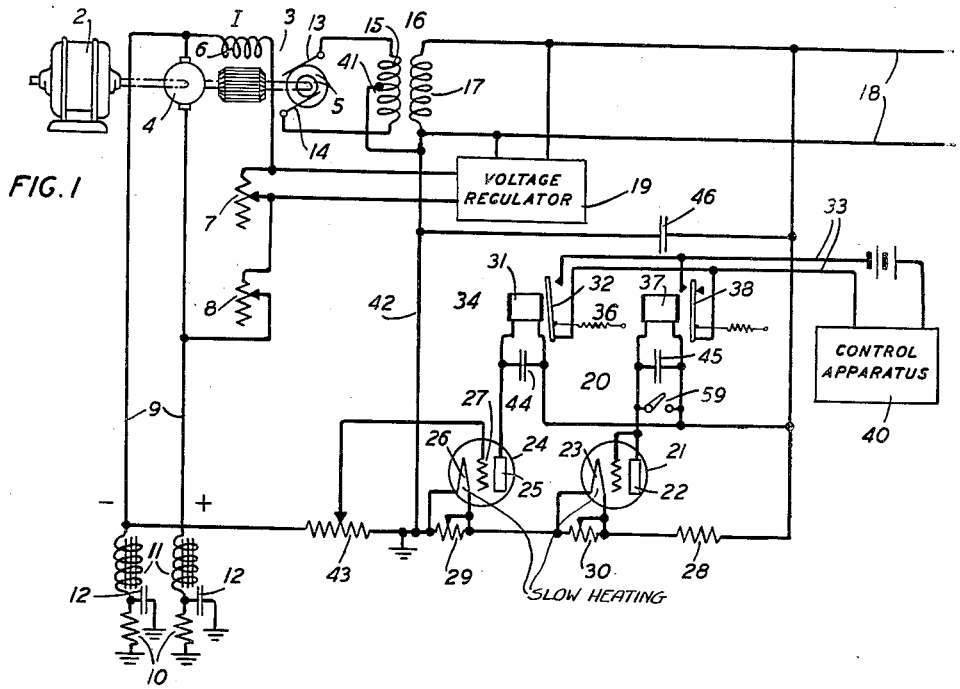

April 16, 1935. J. H. SOLE 1,998,104
GENERATOR CONTROL CIRCUIT
Filed Oct. 12, 1933

INVENTOR
J. H. SOLE
BY Wayne B Wells
ATTORNEY

Patented Apr. 16, 1935

1,998,104

UNITED STATES PATENT OFFICE 1,998,104

GENERATOR CONTROL CIRCUIT

John H. Sole, Brooklyn, N. Y., assignor to Bell Telephone Laboratories, Incorporated, New York, N. Y., a corporation of New York Application October 12, 1933, Serial No. 693,249

15 Claims. (Cl. 171—119)

This invention relates to regulator circuits for dynamo electric machines and particularly to emergency control circuits cooperating with regulator circuits for generators.

One object of the invention is to provide a generator with emergency control circuits that shall become operative in case of abnormal voltage conditions on the generator and in case of generator brush trouble.

Another object of the invention is to provide emergency control circuits for a generator that shall operate a space discharge device in case of abnormally low generator voltage conditions or in case of generator brush trouble for governing a control circuit and that shall operate another space discharge device in case of abnormally high generator voltage conditions for governing said control circuit.

A further object of the invention is to provide emergency control circuits of the above indicated character that shall have the filamentary cathodes of the space discharge devices so connected as to effect operation of the control circuit in case of failure of either of the space discharge devices.

When operating a regulated generator trouble is sometimes encountered in isolated installations by reason of the failure of the regulator for the generator to take care of abnormal voltage changes on the generator. In a telephone system the double current generator which supplies alternating current for ringing purposes and direct current for coin control purposes must have its voltage maintained substantially constant. In case the regulator attached to the generator fails to hold the generator voltage within predetermined limits or in case the generator develops brush trouble means must be provided to substitute a new generator for the generator in service.

In one generator control system constructed in accordance with the present invention a voltage regulator of the type disclosed in the patent to J. H. Sole, No. 1,915,389, dated June 27, 1933 is provided for maintaining the alternating current voltage of a double current generator substantially constant. The generator armature is provided with a commutator and slip rings connected to a one armature winding. Coin control circuits are supplied with direct current from the generator commutator and ringing circuits are supplied with alternating current from the generator slip rings. A transformer is provided between the generator slip rings and the ringing circuits and a tap is taken from the center of the transformer primary winding to provide a third direct current conductor.

One of the brushes connected to the slip rings of a double-current generator of the above indicated type may fail and in such case one-half of the transformer connected to the generator would be supplied with current by the connecting circuits between the coin control direct-current circuits and the lead connected to the mid tap of the transformer primary winding. The voltage regulator will operate to maintain constant voltage on the ringing circuits and under such conditions high voltage will be maintained on the direct-current coin-control circuits. The emergency control circuits which are operated in case of abnormally low or abnormally high voltage on the ringing circuits are also operated in case of failure of one of the brushes connected to the generator slip rings.

The emergency control circuits comprise two space discharge devices having filamentary cathodes. The filamentary cathodes are connected in series with a resistance element across the ringing circuits in order to be operated in accordance with the voltage of the alternating current supplied by the generator. A low voltage relay which is normally operated has the energizing coil thereof connected in circuit with one of the space discharge devices across said resistance element. A normally released high-voltage relay has the energizing coil thereof connected in series with the other space discharge device across said resistance element. In case the alternating current voltage of the generator becomes abnormally low, the low-voltage relay is released to complete the control circuit. The control circuit is also completed by the high-voltage relay in case the generator alternating current rises above a predetermined value. Inasmuch as the two filamentary cathodes of the space discharge devices are connected in series, it is apparent that the failure of either space discharge device will release the low voltage relay to close the control circuit. The space discharge device connected to the low voltage relay is operated at the top bend of the filamentary cathode saturation curve in order that an abrupt reduction in the voltage on the ringing circuits will cause a rapid drop in the current supplied to the low-voltage relay. The space discharge device connected to the high-voltage relay is operated on the steep portion of its filament saturation curve in order to insure a rapid increase in current supplied to the high-voltage relay in case the generator alternating current voltage becomes abnormally high. The filamentary cathodes of the two space discharge devices are preferably composed of tungsten coated with barium in order to provide a thermal inertia in the operation of the devices. Thus, in case of generator voltage surges the thermal inertia of the filamentary cathodes prevents false operation of the high and low voltage relays and the control circuit governed thereby.

A potentiometer which is connected between the negative terminal of the coin control circuits and the mid tap of the primary winding connected to the generator slip rings is connected to the grid of the space discharge device controlling the low-voltage relay. In case of failure of one of the brushes connected to the generator slip rings or in case of failure of one of the alternating current leads from the generator, the voltage impressed on the coin control circuits is raised and an increased negative potential is impressed on the grid of the space discharge device controlling the low voltage relay. The increased negative potential impressed on the grid of this space discharge device increases the impedance of the tube to effect release of the low-voltage relay and operation of the control circuit.

In the accompanying drawing Fig. 1 is a diagrammatic view of a regulator system provided with emergency control circuits constructed in accordance with the invention.

Figure 2:
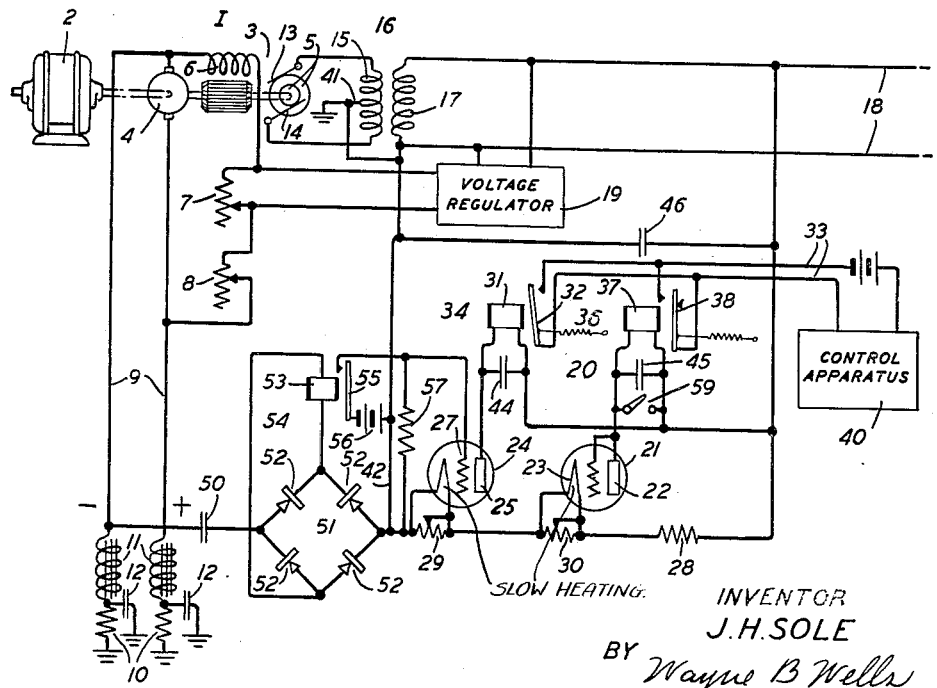

Fig. 2 is a diagrammatic view of a modification of the regulator system shown in Fig. 1.

Referring to the regulator system disclosed in Fig. 1 of the drawing, a double current generator 1 is shown directly connected to a motor 2 of any suitable type. The generator 1 comprises an armature 3 having a commutator 4 and slip rings 5 connected to a single armature winding. A field winding 6 is connected in series with adjustable resistance elements 7 and 8 across the brushes connected to the commutator 4. The commutator 4 is connected to a coin control circuit 9 having load resistances 10 included therein. A filter comprising inductance elements 11 and capacity elements 12 is provided in the coin control circuit 9. Brushes 13 and 14, which are connected to the slip rings 5, are joined to opposite terminals of a primary winding 15 for a transformer 16. A secondary winding 17 of the transformer is connected to a ringing circuit 18.

A voltage regulator 19 of the type disclosed in the J. H. Sole Patent No. 1,915,389 is governed in accordance with the voltage across the ringing circuit 18 for controlling the resistance element 7 in the circuit of the field winding 6. The voltage regulator 19 so controls the current flow through the field winding 6 as to maintain the voltage on the ringing circuit 18 substantially constant. Emergency control circuits 20 are operated in case the voltage on the ringing circuit 18 becomes abnormally high or abnormally low and in case of failure of one of the slip ring brushes 13 and 14. The emergency control circuits comprise a space discharge device 21 having an anode 22 and a filamentary cathode 23 and a space discharge device 24 having an anode 25, a filamentary cathode 26 and a grid control element 27. The cathodes 26 and 23 of space discharge devices 24 and 21 are connected in series with a resistance element 28 across the ringing circuit 18 in order to effect operation of the space discharge devices 24 and 21 in accordance with the alternating current voltage of the generator. The cathodes 26 and 23 are respectively shunted by resistance elements 29 and 30 in order to control the point on the filament saturation curve that the devices are operated.

A low-voltage relay 34 comprising an energizing winding 31 and an armature 32 is controlled by the space discharge device 24 for closing a control circuit 33 in case the voltage on the ringing circuit 18 is abnormally low. The control circuit 33 is also closed by the low-voltage relay 34 in case of failure of one of the slip ring brushes 13 and 14. The low voltage relay 34 is normally maintained in operated position. The winding 31 of the low voltage relay is connected in series with the space discharge device 24 across the resistance element 28. The impedance of tube 24 and the operation of the low-voltage relay 34 may be controlled either by varying the temperature of the cathode 26 or by varying the potential impressed on the grid 27. The space discharge device 24 is operative at the top bend of the filament saturation curve so that an abnormal decrease in the voltage on the ringing circuit 18 will cause a rapid decrease in the current flow through the device 24 and release the low voltage relay 34. The same operation is effected in case the negative potential on the grid 27 is raised above a predetermined point.

A high voltage relay 36 comprising an energizing coil 37 and an armature 38 is controlled by the space discharge device 21 for governing the control circuit 33. The energizing coil 37 of the high voltage relay 36 is connected in circuit with the space discharge device 21 across the resistance element 28. The relay 36 is normally released and is only operated to close the control circuit 33 in case of abnormally high voltage on the ringing circuit 18. The space discharge device 21 is operated on a steep portion of a filament saturation curve in order to effect a rapid increase of current flow through the tube in case of abnormally high voltage on the ringing circuit 18. The control circuit 33 is connected to any suitable control apparatus 40.

A mid tap 41 is taken from the primary winding 15 of the transformer 16 for providing a third direct-current lead 42 from the generator 1. A potentiometer 43 is connected between the negative lead from the commutator of the generator and the lead 42 which is connected to the mid tap of primary winding 15. The potentiometer 43 controls the negative potential impressed on the grid 27 of the space discharge device 24. In case of failure of one of the slip ring brushes 13 or 14 only one-half of the primary winding 15 of transformer 16 will be deenergized. The other half of the primary winding will be energized and the voltage regulator 19 will operate to maintain constant voltage on the ringing circuit 18. In such case, however, high voltage will be maintained on the coin control circuit 9. If the brush 13 connected to the slip rings fails, the lower half of the primary winding 15 will be energized by a circuit including the grounded mid tap from the primary winding 15 and the grounded terminals of the coin control circuit 9. If one of the slip ring brushes 13 and 14 fails it is apparent that the potential across the potentiometer 43 will be increased, such increase in the voltage across the potentiometer 43 increases the negative potential on the grid 27 to lower the current flow through the space discharge device 24 and effect release of the low voltage relay 34.

A condenser 44 is connected across the winding 31 of the low voltage relay 34 and a condenser 45 is connected across the winding 37 of the high voltage relay 36. Such condensers 44 and 45 serve to smooth out the ripples in the rectified current. The condenser 46 serves a similar purpose.

The filaments 26 and 23 of the space discharge devices 24 and 21 are preferably composed of tungsten coated with barium in order to provide a thermal inertia in the heating of the filaments and a delay in the operation of the devices 24 and 21. Time delay in the operation of the devices 24 and 21 is provided in order to prevent operation of the devices 24 and 21 and the relays 34 and 36 by voltage surges on the ringing circuit 18. The cathodes 26 and 23 are connected in series across the ringing circuit 18 in order to insure release of the low-voltage relay 34 in case of failure of either of the devices 24 and 21.

Referring to Fig. 2 of the drawing a modification of the invention is illustrated showing a different means for controlling the potential impressed on the grid of the space discharge device controlling the low-voltage relay. The governing of the control circuit in accordance with the voltage on the ringing circuit is exactly the same in Fig. 2 as in Fig. 1 and similar parts will be indicated by like reference characters. A circuit comprising a condenser 50 and a rectifier bridge 51 is connected between the negative lead from the commutator 4 and the lead 42 connected to the mid tap from the primary winding 15 of the transformer 16. The rectifier bridge circuit 51 comprises four rectifiers 52 which are preferably of the copper oxide type. Two of the vertices are respectively connected to the lead 42 and a terminal of the condenser 50. The energizing coil 53 of an auxiliary relay 54 is connected across the other two vertices of the rectifier bridge 51. The auxiliary relay 54 is provided with an armature 55 which connects the negative terminal of a battery 56 to the grid 27 of the device 24 upon operation of the relay. The device 24 is provided with the grid leak 57.

In the regulator arrangement shown in Fig. 2 of the drawing the negative potential impressed on the grid 27 of the tube 24 is controlled by the alternating current component between the mid tap 41 of the primary winding 15 and the negative lead from the commutator 4. In the regulator system shown in Fig. 1, the potential impressed on the grid 27 is obtained from the direct-current component between the lead 42 and the negative lead connected to the commutator 4. In case of failure of either one of the slip ring brushes 13 and 14 in the system shown in Fig. 2 the alternating current component between the lead 42 and the negative lead connected to the commutator 4 will be increased. This increase in the alternating component is rectified by rectifier bridge 51 for operating the relay 53.

A switch 59 is shown connected across the coil 37 of the high-voltage relay 36 in both Fig. 1 and Fig. 2 of the drawing. This switch is employed to release the high-voltage relay in case it is operated by reason of high-voltage on the ringing circuit 18. When the high voltage relay 36 is operated by reason of high-voltage on the ringing circuit 18 it is held in operative position when the ringing circuit voltage is returned to normal value and must be released by operation of the switch 59. In the circuit disclosed the voltage operating point for the relay 37 is substantially above the voltage releasing point for the relay.

Modifications in the systems and in the arrangement and location of parts may be made within the spirit and scope of the invention and such modifications indicated to be covered by the appended claims.

What is claimed is:

1. In combination, a load circuit, a control circuit, two marginal relays respectively controlled by high-voltage and low-voltage on the load circuit for governing the control circuit, and means comprising two space discharge devices having filamentary cathodes for controlling one of said relays when the load voltage is above a predetermined upper limit and for controlling the other relay when the load voltage is below a predetermined lower limit, said cathodes having sufficient thermal inertia to provide a time delay and insure against operation of said relays by load voltage surges.

2. In combination, a load circuit having the voltage thereof maintained substantially constant, two space discharge devices having filamentary cathodes and anodes, a resistance element, the filamentary cathodes being connected in series with said resistance element across said load circuit for controlling the current flow through the devices according to the load circuit voltage and having a thermal inertia to prevent changes in the operation of the devices by load circuit voltage surges, and two marginal relays respectively connected in series with said devices across said resistance element.

3. In combination, a load circuit, a control circuit, two marginal relays active at different load voltages for governing said control circuit, one relay being normally operated and the other relay being normally released, and means comprising two space discharge devices having anodes and filamentary cathodes for operating the released relay when the load voltage is abnormally high and for releasing the operated relay when the load voltage is abnormally low, the cathodes of said devices being connected in series across the load circuit to insure release of the operated relay upon failure of the filamentary cathode of either of said devices.

4. In combination, a load circuit, a control circuit, a low-voltage normally-operated marginal relay for governing the control circuit when the load voltage is below a predetermined lower limit, a high-voltage normally-released marginal relay for governing the control circuit when the load voltage is above a predetermined upper limit, and means comprising two space discharge devices having filamentary cathodes and anodes for operating the high-voltage relay when the load is above the predetermined upper limit and for releasing the low-voltage relay when the load voltage is below the lower predetermined limit, the cathodes of said devices being connected in series across the load circuit to insure release of the low-voltage relay upon failure of the filamentary cathode of either of said devices.

5. In combination, an alternating current load circuit, two space discharge devices having filamentary cathodes and anodes, said filamentary cathodes being connected in series across said load circuit for controlling the current flow through the devices according to the load circuit voltage, and two marginal relays, one of said relays being normally operated and released upon low load voltage and the other relay being normally released and operated upon high load voltage, said relays having the energizing coils thereof respectively connected in circuit with said devices, the device connected to the high voltage relay normally having the filamentary cathode operating on a position of the cathode temperature saturation curve to insure a rapid increase of current flow through the device and operation of the high voltage relay in case the load voltage rises above a predetermined value and the device connected to the low voltage relay having the filamentary cathode operating near the top of the cathode saturation curve to insure a rapid decrease in current flow through the device to release the low-voltage relay in case the load voltage falls below a predetermined value.

6. In combination, an alternating current load circuit having the voltage thereof maintained substantially constant, two space discharge devices having filamentary cathodes and anodes, means for heating the filamentary cathodes of said devices according to the voltage on the load circuit, a low-voltage relay normally operated and connected in the anode circuit of one of said devices, a high-voltage relay normally released and connected in the anode circuit of the other device, the filamentary cathode of the device connected to the low-voltage relay being operated near the top bend of the temperature saturation curve to produce a rapid decrease of current flow through the device upon abnormal decreased voltage and the filamentary cathode of the device connected to the high voltage relay being operated on the steep portion of the temperature saturation curve to rapidly increase the current flow through the device upon increased voltage, and a control circuit operated by the release of the low-voltage relay in case the load voltage falls below a predetermined value and by the operation of the high-voltage relay in case the load voltage rises above a predetermined value.

7. In combination, an alternating current load circuit, two space discharge devices having filamentary cathodes and anodes, a resistance element, said filamentary cathodes being connected in series with said resistance element across said load circuit for controlling the devices according to the load circuit voltage, a low-voltage relay normally operated and connected in the anode circuit of one of said devices and across said resistance element and a high-voltage relay normally released and connected in the anode circuit of the other device and across said resistance element, the filamentary cathode of the device connected to the low-voltage relay being normally operated on a portion of the temperature saturation curve to insure a quick release of the low-voltage relay if the load circuit voltage falls below a predetermined limit and the filamentary cathode of the device connected to the high-voltage relay being normally operated on a portion of the temperature saturation curve to insure a quick operation of the high-voltage relay if the load circuit voltage rises above a predetermined upper limit.

8. In combination, a generator having a commutator connected to a direct current load circuit and slip rings connected to an alternating current load circuit, a three-element space discharge device, the cathode of said device being operated on a portion of its filament saturation curve to effect a large decrease of current flow through the device upon lowering of the cathode heating current, a control circuit, means for governing said control circuit according to the operation of said device, means comprising a circuit for heating the cathode of said device according to the generator alternating current voltage to operate said control circuit upon change in the generator voltage, and means comprising a potentiometer connected between the generator direct current load circuit and the generator alternating current load circuit for impressing a potential on the grid of said device to control the device and the control circuit in case of failure of one of the generator alternating current leads.

9. In combination, a generator supplying alternating and direct-current to load circuits, connections between the alternating current and direct-current circuits of the generator for maintaining current on the alternating current circuit in case of failure of one of the connections thereof to the generator, a space discharge device, means for controlling said device according to the voltage on the alternating current circuit, and means for controlling said device by the voltage across the connections between the direct-current and alternating circuits in case one of the leads from the generator to the alternating current circuit fails.

10. In combination, a generator having an armature winding supplying direct-current and alternating current to load circuits, means for controlling the generator excitation according to the voltage of the generator alternating current, connections between the alternating current and direct-current circuits for maintaining the alternating current circuit energized in case one of the alternating current circuit leads be disconnected from the generator, a space discharge device having a filamentary cathode, an anode and a grid element, a relay in circuit with said device and normally operated, means for heating the cathode of said device according to the voltage across said alternating current circuit to release said relay in case the alternating current voltage falls below a predetermined point, and for controlling said grid to effect release of said relay in case one of the alternating current leads be disconnected from the generator.

11. In combination, a generator having a commutator and slip rings connected to an armature winding for supplying alternating current and direct-current to load circuits, a voltage regulator for controlling the generator excitation according to the voltage of the alternating current, a three-element space discharge device having the cathode heated according to the voltage of said alternating current, a normally operated relay in the plate circuit of said device, said relay being released when the alternating voltage falls below a predetermined point, and means for impressing a blocking negative potential on the grid of said device to release said relay in case of failure of the circuit connected to the slip ring brushes.

12. In combination, a generator having an armature winding supplying direct-current and alternating current, a transformer connected across the alternating current leads from the generator, a potentiometer connected between one of the direct-current leads from the generator and a tap from the primary winding of said transformer, a control circuit, means comprising a three-element space discharge device having the cathode thereof heated in accordance with the generator alternating current voltage for governing said control circuit, and means for impressing potential on the grid of said device from said potentiometer for governing the device.

13. In combination, a generator having an armature winding supplying a direct current and alternating current, a transformer connected across the alternating current leads from the generator, a potentiometer connected between one of the direct current leads from the generator and a tap from the primary winding of said transformer, a three-element space discharge device having the cathode thereof connected across the alternating current circuit for operating the device according to the alternating current voltage, a normally operated relay connected in circuit with said device, said relay being released if the alternating current voltage falls below a predetermined value, and means for controlling the grid potential of said device from said potentiometer to govern the device and release said relay in case of failure of one of the alternating current generator terminals.

14. In combination, a generator having an armature winding supplying direct-current and alternating current, a transformer connected across the alternating current leads from the generators, a three-element space discharge device having the cathode thereof heated according to the generator alternating current voltage, a normally operated relay in circuit with said device and released when the generator alternating current voltage is abnormally low, an auxiliary circuit connected between one of the generator direct-current leads and a tap from the primary winding of said transformer, said auxiliary circuit having means for blocking the flow of direct-current therethrough, and means comprising a rectifier connected to said control circuit for controlling the grid of said device to release said relay in case of failure of one of the generator alternating current leads.

15. In combination, a generator having an armature winding supplying direct-current and alternating current, a transformer connected across the alternating current leads from the generator, a three-element space discharge device having the cathode thereof heated according to the generator alternating current voltage, a normally operated relay in circuit with said device, said relay being released when the generator alternating current voltage is below a predetermined value, an auxiliary circuit connected between one of the direct-current leads from the generator and a tap from the primary winding of said transformer, a capacity element and a rectifier bridge in said auxiliary circuit, an auxiliary relay having the energizing coil thereof connected to the free vertices of said bridge, and means operated by said auxiliary relay upon failure of one of the alternating current leads from the generator for controlling the grid of said device to release said first mentioned relay.

JOHN H. SOLE.